(12) United States Patent
Le Rouzic et al.

(10) Patent No.: US 9,161,274 B2
(45) Date of Patent: Oct. 13, 2015

(54) METHOD OF PROCESSING A REQUEST TO HAND OVER A COMMUNICATION BETWEEN TWO ACCESS NETWORKS

(75) Inventors: Jean-Claude Le Rouzic, Trebeurden (FR); José Doree, Lannion (FR)

(73) Assignee: Orange, Paris (FR)

( * ) Notice: Subject to any disclaimer, the term of this patent is extended or adjusted under 35 U.S.C. 154(b) by 18 days.

(21) Appl. No.: 14/116,707

(22) PCT Filed: Apr. 27, 2012

(86) PCT No.: PCT/FR2012/050945
§ 371 (c)(1),
(2), (4) Date: Nov. 8, 2013

(87) PCT Pub. No.: WO2012/153033
PCT Pub. Date: Nov. 15, 2012

(65) Prior Publication Data
US 2014/0073327 A1 Mar. 13, 2014

(30) Foreign Application Priority Data
May 9, 2011 (FR) ...................................... 11 53950

(51) Int. Cl.
*H04W 36/14* (2009.01)
*H04L 12/54* (2013.01)
*H04W 36/00* (2009.01)
*H04W 88/06* (2009.01)

(52) U.S. Cl.
CPC ........... *H04W 36/14* (2013.01); *H04L 12/5692* (2013.01); *H04W 36/0022* (2013.01); *H04W 88/06* (2013.01)

(58) Field of Classification Search
None
See application file for complete search history.

(56) References Cited

U.S. PATENT DOCUMENTS

| 8,902,856 | B2 * | 12/2014 | Xing et al. ..................... 370/331 |
| 2006/0258358 | A1 * | 11/2006 | Kallio ............................ 455/437 |
| 2007/0155386 | A1 * | 7/2007 | Wahl et al. ..................... 455/436 |
| 2007/0189220 | A1 * | 8/2007 | Oberle et al. .................. 370/331 |
| 2008/0072310 | A1 * | 3/2008 | Dutta et al. ..................... 726/14 |

(Continued)

FOREIGN PATENT DOCUMENTS

GB 2 443 006 A 4/2008

OTHER PUBLICATIONS

International Search Report mailed Jul. 3, 2012 for International Application No. PCT/FR2012/050945 filed Apr. 27, 2012.

*Primary Examiner* — Kimberly A Williams
(74) *Attorney, Agent, or Firm* — Knobbe Martens Olson & Bear LLP (57) ABSTRACT

Methods and devices for processing a request for connecting a first access network to a core network are disclosed. In some embodiments, the methods comprise receiving a request to hand over to the first network a communication that is set up on a second network, the request including an identifier of the communication, information about a media session associated with the communication on the first network, and information representative of treatment to be applied on the second network to a media session associated with the communication; identifying a second connection entity for connecting the second network to the core network and through which the communication on the second network is passing; transmitting the identifier and the information to the second entity; and transferring to the core network the request together with the information relating to the media session and an identifier of the communication in the core network.

20 Claims, 4 Drawing Sheets

(56) References Cited

U.S. PATENT DOCUMENTS

| | | |
|---|---|---|
| 2008/0080480 A1 | 4/2008 | Buckley |
| 2010/0067493 A1 | 3/2010 | Mahdi |
| 2010/0332610 A1* | 12/2010 | Cherian et al. ................ 709/207 |
| 2011/0032906 A1* | 2/2011 | Mutikainen et al. .......... 370/331 |
| 2014/0307706 A1* | 10/2014 | Keller et al. ................... 370/331 |
| 2015/0003342 A1* | 1/2015 | Swaminathan et al. ....... 370/329 |

* cited by examiner

METHOD OF PROCESSING A REQUEST TO HAND OVER A COMMUNICATION BETWEEN TWO ACCESS NETWORKS

RELATED APPLICATIONS

This application is the U.S. National Phase of Application No. PCT/FR2012/050945 entitled "METHOD FOR PROCESSING A REQUEST FOR SWITCHING A CALL BETWEEN TWO ACCESS NETWORKS" filed Apr. 27, 2012, which designated the United States, and which claims the benefit of French Application No. 1153950 filed May 9, 2011.

BACKGROUND OF THE INVENTION

The present invention relates to the general field of telecommunications.

It relates more particularly to managing the handover between two access networks connected to a core network of a communication (or a call in the general meaning of the term) set up by a terminal over one of the access networks.

The term "communication" is used herein to designate any multimedia data exchange between two terminals and managed via the core network, such as for example a telephone call or a video conference. In the meaning of the invention, a call is constituted firstly by the media session (i.e. media stream) conveying the multimedia data being exchanged, and secondly the communication signaling (i.e. the call signaling) needed for exchanging the data.

The invention applies in preferred but non-limiting manner when the core network is an IP network based on an IP multimedia subsystem (IMS) architecture and using a signaling protocol of the session initiation protocol (SIP) type.

Most telecommunications operators are nowadays beginning to migrate their circuit switched (CF) telephone networks to packet switched (PS) IP core networks, such as for example voice-over IP networks.

In packet-switched networks, a given terminal, providing it is multimode (and/or multiband), may be connected to and registered with the IP core network via a plurality of accesses, such as a third-generation (3G) access network, a set of x digital subscriber line (xDSL), an evolved packet core (EPC) network, a wireless local area network (WLAN), a worldwide interoperability for microwave access (WiMax) network, etc.

A multimode terminal makes it possible for its user to select a network from among the various access networks that are compatible with the terminal for the purpose of setting up a communication. The selection criteria applied generally relate to the user or to the operator of the IP core network: operator charging policy, quality of communication, available bandwidth, etc.

The terminal also makes it possible for the user to hand over an ongoing communication from one access network (an "initial" network) to another access network (a "target" network) if, for example, the quality of transmission on the initial access network becomes poor. This is referred to as communication handover between the initial access network and the target access network, or indeed as PS-PS mobility. This handover may apply to some or all of the media streams associated with the communication and/or the signaling: there is then said to be total or partial transfer of the communication.

Figure 1:
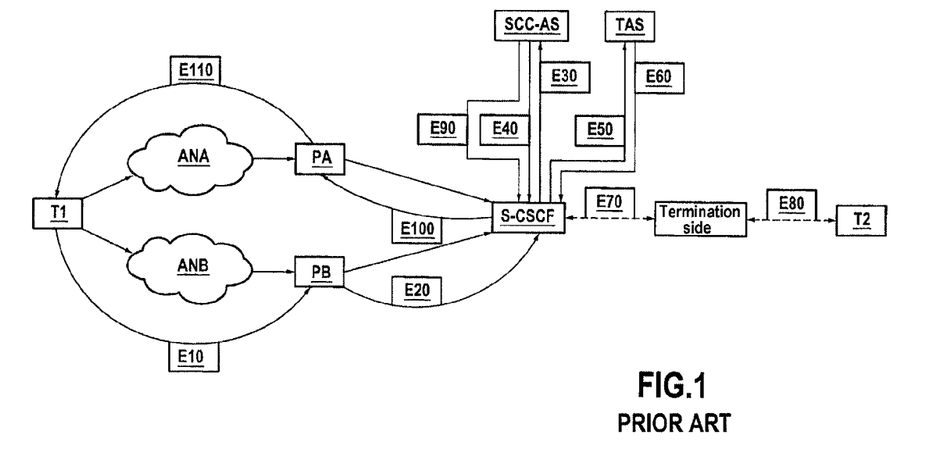
FIG. 1, described above, is a diagram showing the operation of an application server dedicated to session handover between various access networks, as described in prior art document 3GPP TS24.237.

In order to guarantee continuity of service while the communication is being handed over and in order to make this operation transparent for the user, mechanisms have been defined for the IMS architecture in the documents 3GPP TS23.237 and TS24.237 (IP multimedia subsystem service continuity; stage 2, and IP multimedia subsystem service continuity, stage 3). These handover mechanisms rely on a dedicated application server known as a service centralization and continuity application server (SCC-AS) in the IMS network being engaged for the purpose of managing the signaling received from the terminal during the handover. FIG. 1 is a diagram of the operation of such a server.

In the example shown in FIG. 1, a terminal T1 is a two-mode terminal connected to and registered with an IP core network on two packet-switched access channels ANA and ANB. The IP core network has IMS architecture and it relies in particular on proxy-call session control function (P-CSCF) servers PA and PB, on a serving-call session control function (S-CSCF) server, on a telephone application server (TAS), and on a service centralization and continuity application server (SCC-AS) as defined in the documents 3GPP TS23.237 and TS24.237.

It is assumed that the terminal T1 has set up a communication with the terminal T2 over the network ANA. This communication is anchored at the server SCC-AS with corresponding media session information.

In accordance with document TS24.237, in order to cause this communication to be handed over from the access network ANA to the access network ANB, the terminal T1 sends an INVITE request over the network ANB containing the information about the media session associated with the communication over ANB (i.e. the characteristics of the media streams reserved for the communication over ANB) (step E10).

This INVITE request satisfies various constraints set by the standard (and described for example in the following documents: 3GPP TS24.229, IETF RFC 5627, IETF RFC 3891, and IETF RFC 4538), and relating in particular:

to the content of its uniform resource identifier (URI); and
to the presence of a "replaces" or a "target-dialog" header (as defined in documents RFC 3891 and RFC 4538), containing the references of the communication set up over the network ANA.

The INVITE request sent by T1 is conventionally relayed by the server PB to the server S-CSCF (step E20), and then routed by the server S-CSCF to the server SCC-AS (step E30).

On the basis of the information contained in the "replaces" or "target-dialog" header, the server SCC-AS sets up a correlation between the INVITE request and the communication set up between the terminals T1 and T2 over the access network ANA. It then interprets the INVITE request as a request to hand over the communication from the network ANA to the network ANB, and it updates the session information relating to the communication with the information contained in the request.

Thereafter it transmits a re-INVITE request containing this information to the terminal T2 (steps E40-E80).

Thereafter, numerous exchanges of signaling are performed by the server SCC-AS and by the terminals T1 and T2 to cause the communication to be handed over to ANB, and in particular to cause the media streams associated with the communication to be handed over (steps E90-E110). All of this signaling passes through and is processed by the server SCC-AS.

Thus, the handover solution presently proposed in the 3GPP standard is expensive and complex both in the IP core network and in the terminals.

In order to be capable of performing that technique, the terminals must comply with several standards relating in particular to how to construct the handover INVITE request (for example in order to comply with all of the standardized options, they must be capable of including both the "replaces" and the "target-dialog" headers).

In the core network, that solution requires a dedicated application server SCC-AS to be engaged for managing the signaling received from the terminals via the different access networks.

However, it is known that engaging a plurality of application servers, and a fortiori a dedicated server for managing a service, is expensive in terms of resources and processing for the server S-CSCF. This triggering also generates large amounts of signaling exchanges within the network, which phenomenon is amplified by the numerous exchanges needed between the terminals and the SCC-AS server.

OBJECT AND SUMMARY OF THE INVENTION

The invention seeks in particular to remedy those drawbacks by entrusting the management of handing over a communication between the two access networks (initial and target) to the connection entities for connecting these access networks to the core network. The term "connection entity for connecting the access network to the core network" is used herein to mean the entry point to the core network for the terminal connected to the access network. In the meaning of the invention, this connection entity is connected to the signaling planes both of the access network and of the core network, and also controls the media planes of the access network and of the core network (i.e. the plane in each network for transporting, accessing, and communicating packets), either directly or else indirectly via intermediate equipment. The connection entity in the meaning of the invention may thus be distributed over a plurality of pieces of equipment depending on the architecture of the intended core network.

More precisely, the invention proposes creating a (logical or physical) communication channel between the two connection entities, enabling these entities to dialog in order to recover the information needed for the handover.

Thus, in a first aspect, the invention provides a method of processing a request performed by a first connection entity for connecting a first access network to a core network. According to the invention, the method comprises:

a reception step of receiving a handover request to hand over to the first access network a call set up by a terminal on a second access network, the request being received from the terminal over the first access network and comprising:
  an identifier of the communication;
  information about a media session associated with the communication over the first access network; and
  information representative of at least one treatment to be applied to a media session associated with the communication on the second access network;
an identification step of identifying from the handover request a second connection entity for connecting the second access network to the core network through which the communication over the second access network is passing;
a transmission step of transmitting the communication identifier and the information representative of said at least one treatment to the second entity as identified in this way in order to apply said at least one treatment; and
a transfer step of transferring the handover request to the core network together with the information about the media session and an identifier of the communication in the core network as obtained with the help of the communication identifier received from the terminal.

Correspondingly, the invention also provides a connection entity for connecting a first access network to a core network, the connection entity comprising:

reception means for receiving a handover request for handing over to the first access network a communication set up by a terminal over a second access network, said request being received from the terminal over the first access network and comprising:
  an identifier of the communication;
  information relating to a media session associated with the communication on the first access network; and
  information representative of at least one treatment to be applied to a media session associated with the communication on the second access network;
identification means for identifying from the handover request a second connection entity for connecting the second access network to the core network and via which the communication over the second access network is passing;
transmission means for transmitting the identifier of the communication and the information representative of said at least one treatment to the second entity as identified in this way in order to apply said at least one treatment; and
transfer means for transferring to the core network the handover request together with the information relating to the media session and an identifier of the communication in the core network as obtained with the help of the identifier of the communication received from the terminal.

In order to simplify the present description, the term "transfer" is used regardless of whether or not the handover request is modified by the connection entity.

For a core network relying on IMS architecture, the connection entities may in particular be P-CSCF servers that connect the access networks to the core network.

In a variant, they could be servers controlling access to the core network, also known as session border control (SBC) servers. In known manner, an SBC server is a security element of the network that is located between the terminal and the P-CSCF server or that replaces the P-CSCF server, and that authorizes dynamic opening of media streams if they correspond to requests made at signaling level.

P-CSCF servers are connected like SBC servers to the signaling plane and they control the media planes of the core network and of the access network. It should be observed that for P-CSCF servers, control of a media plane may be direct or indirect via requests sent to intermediate equipment driving the media plane.

Naturally, the invention also applies when a single entity is in charge of connecting both the first access network and the second access network to the core network. The means for transmitting the identifier of the communication and the information representative of the treatment to be applied to the session are then means internal to the connection entity.

Thus, by entrusting the management of the handover to the connection entities for connecting the access networks to the core network, the invention advantageously makes it possible to avoid engaging a dedicated application server in the core network, thereby limiting the amount of signaling that needs to be exchanged to perform the handover.

The connection entities are at the intersections between the access networks and the core network, so they have a view over both the access side and the core network side.

In addition, firstly these entities manage signaling in the network (and can therefore modify signaling elements such as the handover request, should that be necessary), and secondly they are responsible for control of the media plane. They are thus in possession of all of the information relating to the already-setup communication that is needed for the handover, and can therefore act either directly or else via explicit requests on the media streams engaged in the communication.

Furthermore, the elements contained in the handover request enable the first connection entity to identify the entity in charge of the media streams of the communication that is to be transferred, in other words the second connection entity, for the purpose of informing it of the treatment to be performed on the media session (e.g. partial or total release of the media streams engaged on the second access network). "Direct" communication between the two connection entities serves to limit the amount of signaling that is exchanged over the network in order to release the media streams.

Thus, for example, in an implementation of the invention, during the identification step, the second connection entity is identified with the help of an identifier of the terminal in the second access network and contained in the handover request. This identifier may advantageously be compared with the information that is obtained dynamically by the first connection entity while registering the terminal with the core network via the first access network, and it includes in particular the contact addresses of the terminal on the core network. In a manner known to the person skilled in the art, these contact addresses are constituted by the IP addresses of the connection entities enriched with contextual information associated with the terminal (or with the subscriber).

In a variant, in another embodiment, the second connection entity is identified by the first connection entity by using an identifier of the second entity on the second access network (e.g. its IP address on the second access network) contained in the handover request received from the terminal. Advantageously, the first connection entity stores a static table providing the correspondence, for each connection entity for connecting an access network to the core network, between the identifier of the connection entity on its access network and the identifier of the connection entity on the core network, thereby enabling the first connection entity to identify the second connection entity.

In addition, and if necessary, the first connection entity modifies the identifier of the communication contained in the handover request in order to insert an identifier of the communication in the core network, such as for example identifiers of a dialog associated with the communication in the core network. In this way, the transfer request transferred to the core network by the first entity refers to a communication that is known within the core network, thus enabling said request to be processed by the entities through which it passes in the core network as a conventional request for renegotiating media streams in the core network.

It will readily be understood that the service logic and the signaling needed for managing the handover are simplified by means of the invention. The time required to respond to the handover request from the terminal is also reduced and the invention is very simple to implement in the terminal.

It should be observed that the invention advantageously makes it possible for the signaling associated with the communication to be handed over completely from the second access network to the first access network (whereas the handover of the media session may be partial or total depending on the session information contained in the request). Once the handover request has been sent by the terminal over the first access network, and since the connection entities are capable on their own of managing the media streams, there is no need for the terminal to continue exchanging signaling over both access networks. In other words, it matters little what happens to its connection with the second access network (e.g. failed radio link, etc.), the terminal can immediately start sending signaling messages about the communication over the first access network only. In contrast, in the handover mechanisms proposed in the 3GPP standard, the signaling might be maintained over both access networks, in particular in the event of a partial handover of the media session associated with the communication.

In addition, in a core network connected to a plurality of access networks via connection entities in accordance with the invention, management of the handover of communications is distributed over all of the connection entities. Thus, if a failure should affect one of the connection entities, it remains possible for the other connection entities for making connections with the core network to hand over communications (either to the same access network if the core network has a plurality of connection entities to a single access network, or else to other access networks if the terminal has other access interfaces). The solution proposed by the invention is thus more robust than when handovers are managed in centralized manner by a single SCC-AS server.

In a particular implementation of the invention, the handover request received from the terminal further includes information relating to the media session associated with the communication on the second access network, this information being transmitted to the second entity, at least in part and together with the identifier of the communication and the information representative of said at least one treatment.

This information is advantageously additional to the information representative of the treatment(s) to be applied to the media session associated with the communication in the second access network and contained in the handover request. In particular, it may comprise the descriptions of specific media streams on which the treatment is to be applied, in other words, when the treatment to be applied is partial release of resources, for example, the descriptions of the specific media streams that are concerned by the release.

In a preferred implementation of the invention:
the information representative of the treatment(s) to be applied to the media session associated with the communication on the second access network is contained in a header of the handover request; and
the information relating to the media session associated with the communication on the second access network is contained in a session description protocol (SDP) offer of the handover request.

Thus, in this embodiment, on identifying in the header of the handover request a particular treatment such as partial release of the resources, the second connection entity can consult the SDP offer contained in the handover request in order to obtain additional information relating to the treatment.

In a particular implementation of the invention, the identifier of the communication in the core network is obtained from the second entity (with the help of the identifier of the communication as received from the terminal).

This implementation of the invention applies in preferred but non-limiting manner to networks using the SIP protocol in which the connection entities (typically P-CSCF or SBC servers) behave as "back-to-back user agents".

In known manner, a "back-to-back user agent" incorporates both the function of an agent for making calls and the function for receiving calls, as contrasted with a proxy mode connection entity that acts solely as an SIP router. Thus, the use of a "back-to-back user agent" type connection entity has the consequence of the non-identical identifiers of the communication on either side of the entity (i.e. on the access network side and on the core network side). In other words, the identifier of the call known to the terminal and received in the handover request does not correspond to the identifier of the call used on the core network.

In contrast, the identifier of the call used on the core network is known to the second connection entity via which the call has been set up on the second network. It is associated in the connection entity with an identifier of the communication on the second access network, which identifier is known to the terminal and sent in the handover request. The invention thus proposes recovering the identifier of the communication on the core network from the second entity by using the identifier of the communication contained in the request received from the terminal.

It should be observed that the solution presently proposed in the 3GPP standard and described above with reference to FIG. 1 does not enable such a situation to be handled. It relies on the identifiers of the communication being identical all along the call path.

Naturally, the invention also makes it possible to manage handover of the communication when the identifiers are identical. Under such circumstances, the identifier of the communication on the core network is the identifier of the communication received from the terminal.

Thus, the invention is remarkable in that it can be applied to different configurations of the core network: connection entities in proxy mode or in "back-to-back user agent" mode, and even the same connection entity for both accesses, or entities that are distinct, etc.

In a particular implementation, the processing method further comprises:
  an obtaining step of obtaining context information relating to the communication from the second entity and with the help of the identifier of the communication received from the terminal, the context information containing the identifier of the communication in the core network; and
  an insertion step of inserting said context information into the handover request before transferring it to the core network.

In the meaning of the invention, the term "contextual information" is used to any type of information about setting up the call. This naturally includes information about the current communication context (also known as the "call context"), such as for example in an SIP network, the dialog identifiers, the identities of the entities to be passed through in the core network (also known as the "routeset"), or more generally the information to be found in the "dialog state" as described in document IETF RFC3261. However it may also be information relating to the registration context of the user with the connection entity, to the current subscription contexts, etc. More generally, the term "contextual information" may be used in the meaning of the invention to designate any information needed by the first connection entity for modifying the ongoing communication, and that is present in or stored at the second connection entity.

In an implementation of the invention,
  the core network is an IP network implementing the SIP protocol;
  the handover request received from the terminal is an INVITE call setup request; and the information representative of said at least one treatment is contained in a predefined header of the handover request received from the terminal.

This implementation makes it very simple to perform the invention: the handover request differs from a conventional request for setting up a call merely by the presence of a new predefined header containing the information required for according to the invention for managing the handover. In order to be interpreted as such by the first connection entity in accordance with the invention, this header must naturally be declared in appropriate manner with the Internet assigned number authority (IANA).

In a particular implementation, it may also contain an identifier of the second connection entity for connecting the second access network to the core network and/or an identifier of the terminal on the second access network.

In another implementation, the identifier of the communication and the information representative of said at least one treatment are transmitted via a physical channel that has previously been set up between the first entity and the second entity, the context information being obtained via this channel.

In this implementation, the dialog channel between the two connection entities is a physical channel set up by construction of the network in permanent manner, prior to any handover request.

In a variant, the dialog channel set up between the first connection entity and the second connection entity may be an ephemeral logic channel, that is set up for each handover request received from a terminal.

Various entities co-operate in handing over the communication between the first and second access networks in accordance with the invention: the connection entity for connecting the first access network to the core network, and also the connection entity for connecting the second access network to the core network and the terminal requesting handover of the communication.

Thus, in a second aspect, the invention also provides a method of treating a media session, the method comprising:
  a reception step of receiving a request coming from a first connection entity for connecting a first access network to a core network, said first entity being in charge of handing over to the first access network a communication that has been set up by a terminal over a second access network, the request comprising:
    an identifier of the communication; and
    information representative of at least one treatment to be applied to a media session relating to said communication; and
  an application step of applying said at least one treatment to the media session;
  the treatment method being performed by a second connection entity for connecting the second access network to the core network, and through which said communication is passing.

Correspondingly, the invention also provides an entity comprising:
  reception means for receiving a request coming from a first connection entity for connecting a first access network to a core network, said first entity being in charge of handing over to the first access network a communication set up by a terminal on a second access network, the message comprising:
    an identifier of the communication; and
    information representative of at least one treatment to be applied to a media session relating to the communication; and application means for applying said at least one treatment to the media session;

the entity being a connection entity for connecting the second access network to the core network and via which the call is passing.

Total or partial release of resources engaged in the communication in the second network is thus performed by the second connection entity on receiving a request from the first connection entity in charge of handing over the communication.

In a third aspect, the invention also provides a method of sending a request from a terminal on a first access network connected to a core network via a first connection entity, the request being a handover request to hand over to the first access network a communication set up by the terminal over a second access network. In accordance with the invention, the handover request comprises:

an identifier of the communication;
information relating to a media session associated with the communication on the first access network; and
information representative of at least one treatment to be applied to a media session associated with the communication on the second access network.

Correspondingly, the invention also provides a multimode terminal suitable for communicating over first and second access networks connected to a core network, the terminal comprising:

setup means for setting up a communication over the second access network; and
send means for sending over the first access network a handover request for handing the communication over to the first access network, said request comprising:
an identifier of the call;
information relating to a media session associated with the communication on the first access network; and
information representative of at least one treatment to be applied to a media session associated with the communication on the second access network.

The invention is simple to perform in the terminal, since the elements inserted in the handover request are known to the terminal. These elements enable the connection entity to interpret the request as a request to hand over a communication that has been set up over the second network and to identify the connection entity to which to transfer the information about the treatment of the resources engaged in the second network.

In a fourth aspect, the invention also provides a communication system comprising:

a multimode terminal in accordance with the invention, suitable for communicating over first and second access networks, and for sending a handover request to the first access network for handing over a communication set up on the second access network;
a first connection entity in accordance with the invention for connecting the first access network to a core network and suitable for processing said handover request; and
a second connection entity for connecting the second access network to the core network and through which the communication passes on the second access network, the second entity being in accordance with the invention and suitable for applying at least one treatment to a media session associated with said communication.

The communication system of the invention provides the same advantages as the above-specified connection entity.

In a fifth aspect, the invention also provides a signal sent by a terminal over a first access network connected to a core network, the signal conveying a request to hand over to the first access network a communication that has been set up by the terminal over a second access network. In accordance with the invention, the signal is remarkable in that said handover request comprises:

an identifier of the communication;
information relating to a media session associated with the communication on the first access network; and
information representative of at least one treatment to be applied to a media session associated with the communication on the second access network.

In a particular implementation, the various steps of the method of processing a request, of the method of treating a media session, and of the method of sending a request are determined by computer program instructions.

Consequently, the invention also provides a computer program on a data medium, the program being suitable for being performed in a connection entity for connecting an access network to a core network or more generally in a computer, the program including instructions adapted to performing steps of a method of processing a request, as described above.

The invention also provides a computer program on a data medium, the program being suitable for being performed in a connection entity for connecting an access network to a core network or more generally in a computer, the program including instructions adapted to performing steps of a method of treating a media session, as described above.

The invention also provides a computer program on a data medium, the program being suitable for being performed in a terminal or more generally in a computer, the program including instructions adapted to performing steps of a method of sending a request, as described above.

These programs may use any programming language, and may be in the form of source code, object code, or code intermediate between source code and object code, such as in a partially compiled form or in any other desirable form.

The invention also provides a computer readable data medium including instructions of a computer program as specified above.

The data medium may be any entity or device capable of storing the program. For example, the medium may include storage means such as a read only memory (ROM), e.g. a compact disk (CD) ROM, or a microelectronic circuit ROM, or indeed magnetic recording means, e.g. a floppy disk or a hard disk.

Furthermore, the data medium may be a transmissible medium such as an electrical or optical signal that may be conveyed via an electrical or optical cable, by radio, or by other means. The program of the invention may in particular be downloaded from an Internet type network.

Alternatively, the data medium may be an integrated circuit in which the program is incorporated, the circuit being suitable for being executed or for being used in the execution of the method in question.

In other implementations and/or embodiments, it is also possible to envisage that the method of processing a request, the method of treating a media session, the method of sending a request, the connection entities, the terminal, the communication system, and the signal of the invention present in combination all or some of the above-specified characteristics.

BRIEF DESCRIPTION OF THE DRAWINGS

Other characteristics and advantages of the present invention appear from the following description made with reference to the accompanying drawings and to the appendices, which show an implementation having no limiting character.

In the figures.

In the appendices.

Appendix 1 shows an example of a handover request that can be sent by the terminal UE1 shown in FIG. 2 and that can be carried by a signal in accordance with the invention in a particular implementation.

Appendix 2 gives an example of a request that can be sent by the connection entity P-CSCFB to the connection entity P-CSCFA of FIG. 2 on receiving the handover request from the terminal.

Appendix 3 gives an example of a message that can be sent by the connection entity P-CSCFA to the connection entity P-CSCFB of FIG. 2, in response to the request described in Appendix 2; and Appendix 4 gives an example of a handover request suitable for being transferred by the connection entity P-CSCFB to the core network CN of FIG. 2 on receiving the handover request described in Appendix 1 and the response message described in Appendix 3.

DETAILED DESCRIPTION OF AN IMPLEMENTATION

Figure 2:
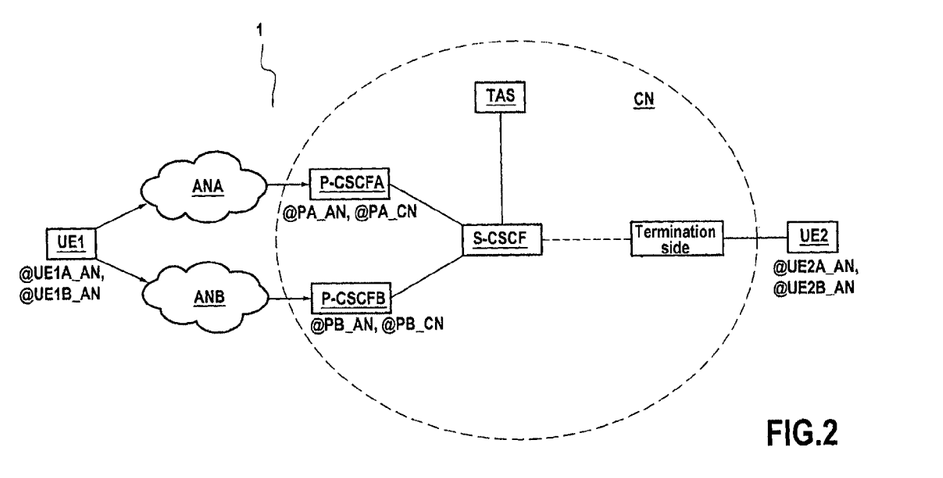
FIG. 2 shows a communications system in accordance with a particular embodiment of the invention, in its environment.

FIG. 2 shows a communications system 1 in accordance with a particular embodiment of the invention in its environment.

In this embodiment, the communications system 1 is suitable for managing the handover to an access network ANB of a communication that is already set up by a terminal UE1 on an access network ANA with a terminal UE2.

In this example, the access networks ANA and ANB are packet-switched networks, such as for example the following access networks: 3G; xDSL; EPC; WLAN; WiMax; CDMA2000, etc. They are connected to a core network CN.

In the presently-envisaged example, the core network CN is a voice over IP network incorporating an IMS architecture and using session initiation protocol (SIP) for the signaling exchanged within the network. The characteristics of the IMS architecture and of the SIP protocol are defined respectively in the 3GPP and IETF standards, and in particular in the following documents: 3GPP TS 22.228 "Service requirements for the IP multimedia core network subsystem (stage 1)", and IETF RFC 3261 "Session initiation protocol". They are therefore not described in detail herein.

Nevertheless, these assumptions concerning the core network are not limiting. Thus, core networks relying on transport protocols other than the IP protocol, and indeed other network architectures (e.g. an H323 architecture relying on access network connection entities known as "gatekeepers" providing control both over the media plane and over the signaling plane) or other signaling protocols (e.g. a proprietary signaling protocol) may be envisaged in the context of the invention.

In known manner, the core network CN comprises a plurality of functional entities, and in particular:
a call session control function (CSCF) entity; and
a plurality of application servers hosting and supplying services, such as for example a telephone application server TAS handling caller side communications (call forwarding, secrecy, etc.).

The CSCF entity is itself made up of a plurality of servers, including a serving call session control function (S-CSCF) server in charge in particular of registering terminals on the core network CN, and one or more proxy call session control function (P-CSCF) servers, which are points of contact for the terminals with the core network.

In the presently-envisaged architecture, the core network CN relies on a distinct P-CSCF server for each access network to which it is connected: thus, the server P-CSCFA serves to connect the access network ANA to the core network CN, and the server P-CSCFB serves to connect the access network ANB to the core network CN. The servers P-CSCFA and P-CSCFB are thus respective connection entities for connecting the access networks ANA and ANB respectively to the core network CN.

In addition, each P-CSCF server in this example operates in "back-to-back user agent" mode. Two distinct identifiers (i.e. two distinct IP addresses) are allocated to each P-CSCF server shown in FIG. 2:
an IP address identifying the server on the access network to which it is connected: the server P-CSCFA is thus identified by the address @PA_AN on the access network ANA, while the server P-CSCFB is identified by the address @PB_AN on the access network; and
an IP address identifying the server on the core network CN: the servers P-CSCFA and P-CSCFB are thus identified by the addresses @SP_CN and @PB_CN respectively on the core network CN.

Nevertheless, these assumptions are not limiting: the invention is equally applicable when the servers P-CSCFA and P-CSCFB operate in proxy mode, or when a single P-CSCF server is in charge of connecting both of the access networks ANA and ANB, this server possibly behaving as a "back-to-back user agent" or as a proxy. The person skilled in the art can easily adapt the description below to one and/or the other of these configurations.

The invention thus discloses two additional functions or devices referred to as P-CSCFA and P-CSCFB associated with a changeover (clearly a given piece of apparatus in a real hardware architecture might contain both types of device, i.e. might be capable of performing both functions).

By definition, the connection entities P-CSCFA and P-CSCFB are suitable for generating the signaling exchange over the network (where the term "network" is used herein to cover both the access network and the IP core network), and in particular SIP signaling: they are thus capable of modifying signaling elements, if necessary, and in particular of modifying the contents of SIP requests for their headers. In addition, they are responsible for controlling the media plane of the network, either directly or else indirectly, via requests sent to intermediate pieces of equipment acting on the media plane.

Figure 3A:
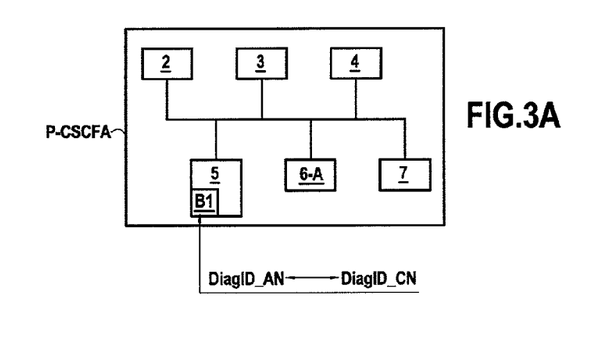
FIGS. 3A and 3B are diagrams showing the hardware architecture of connection entities in accordance with the invention and forming part of the communications system shown in FIG. 2.
Figure 3B:
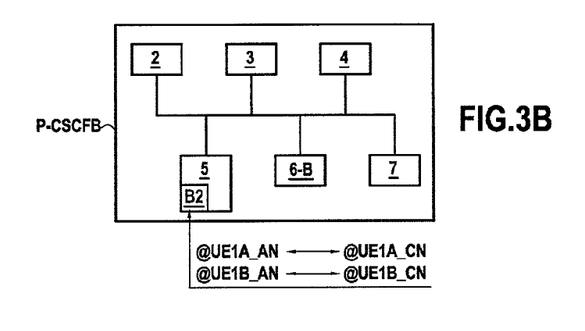

In this example, the connection entities P-CSCFA and P-CSCFB have the hardware architecture of a computer, as shown diagrammatically in FIGS. 3A and 3B, respectively. Each connection entity comprises in particular a processor 2, random access memory (RAM), ROM 4, non-volatile memory 5, communications means 6 for communicating over the access network to which it is connected (i.e. communications means 6-A over ANA for the entity P-CSCFA, and correspondingly 6-B over ANB for the entity P-CSCFB), and communications means 7 over the IP core network. In the presently-described example, the communications means 6-A, 6-B, and 7 also perform the SIP protocol.

The ROMs 4 of the connection entities P-CSCFA and P-CSCFB constitute a recording medium in accordance with the invention, readable by the processor 2 and having recorded thereon computer programs in accordance with the invention, including instructions for executing steps of a method of processing a request and a method of treating a media session of the invention as described below.

The mobile terminal UE1 is a two-mode terminal in accordance with the invention, suitable for communicating over the access networks ANA and ANB on which it is identified by respective IP addresses @UE1A_AN and @UE1B_AN.

Figure 4:
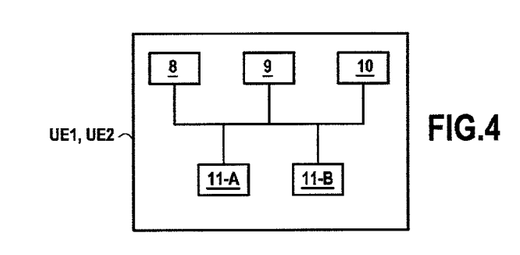
FIG. 4 is a diagram of the hardware architecture of a terminal in accordance with the invention and forming part of the communications system shown in FIG. 2.

In this example, the terminal UE1 has the hardware architecture of a computer, as shown diagrammatically in FIG. 4. In particular, it comprises a processor 8, RAM 9, ROM 10, and communication means 11-A for communication over the access network ANA and communications means 11-B for communication over the access network ANB. In the presently-described example, the communications means 11-A and 11-B also perform the SIP protocol.

The ROM 10 in the terminal UE1 constitutes a recording medium in accordance with the invention, readable by the processor 8 and having recorded thereon a computer program in accordance with the invention, including instructions for executing steps of a method of sending a request in accordance with the invention, as described below.

The terminal UE2 may be any terminal. In the presently-described embodiment, it is likewise a two-mode terminal in accordance with the invention, suitable for communicating over the networks ANA and ANB, on which it is identified by the following respective IP addresses: @UE2A_AN and @UE2B_AN.

It should be observed that since the invention relates to handing over a communication between two access networks, the description is limited herein to two-mode terminals communicating over both networks. Nevertheless, the invention applies equally to multimode terminals capable of communicating over more than two access networks.

Furthermore, in the presently-described example, in order to implement the invention there is no need for the terminal UE2 to be in accordance with the invention, since this terminal does not originate the handover request.

Figure 5:
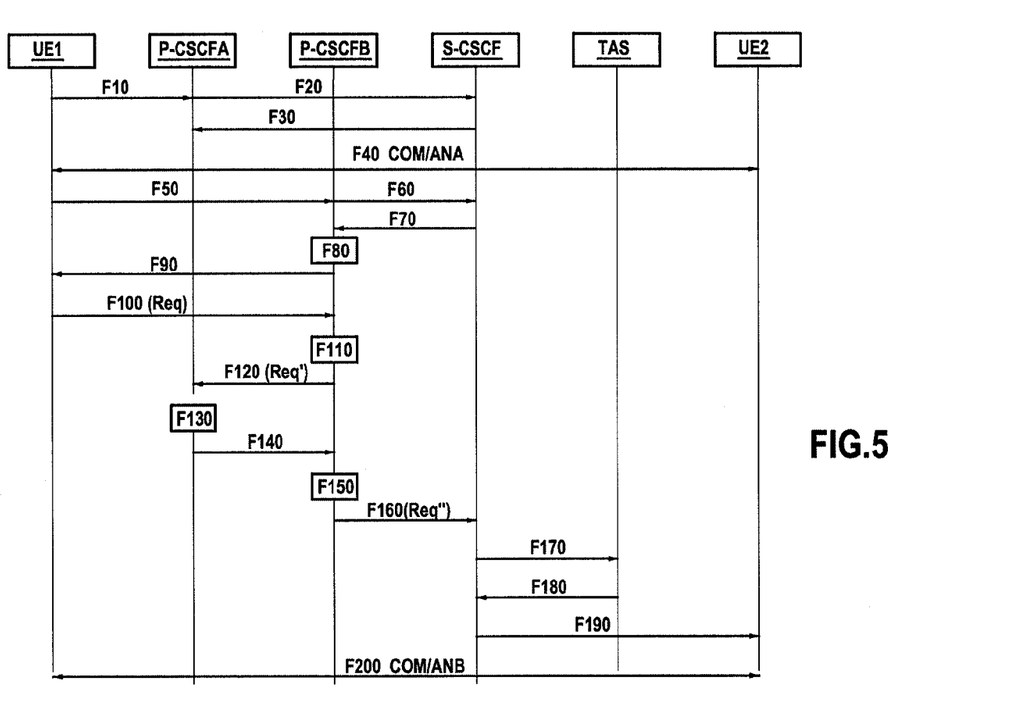
FIG. 5 is a diagram showing the main steps performed in accordance with the invention while handing over between the access networks ANA and ANB a session that is associated with a communication that is already set up by the terminal UE1 in FIG. 2.

With reference to FIG. 5 and Appendices 1 to 4, there follows a description of the main steps of a method of processing a handover request, of a method of treating a media session, and of a method of sending a handover request, all in accordance with the invention, in a particular implementation in which the methods are performed respectively by the connection entities P-CSCFA and PC-CSCFB, and by the terminal UE1.

In this example, consideration is given to managing the changeover of a communication set up by the terminal UE1 with the terminal UE2 from the access network ANA (the initial network and the "second" network in the meaning of the invention) to the access network ANB (the target network, and the "first" network in the meaning of the invention).

It is assumed that the terminal UE1 has previously been registered with the core network CN over the access network ANA in known manner, by sending an SIP REGISTER request for requesting registration over the network ANA to the core network CN. This registration request contains in particular the IP address @UE1A_AN of the terminal UE1 on the access network ANA.

In known manner, the registration request passes via the connection entity P-CSCFA (step F10), which generates a contact address @UA1A_CN on the core network associated with the IP address @UE1A_AN of the terminal UE1. This contact address @UE1A_CN corresponds to the IP address @PA_CN of the entity P-CSCFA on the core network CN enriched by contextual information relating to the terminal UE1.

The connection entity P-CSCFA transfers the registration request and the contact address @UE1A_CN of the terminal UE1 to the server S-CSCF (step F20). In the presently-described implementation, the connection entity P-CSCFA also transmits the IP address @UE1A_AN of the terminal UE1 on the access network ANA to the server S-CSCF as a specific parameter of the registration request.

In response to this request, the server P-CSCF transmits a validity duration for the registration to the terminal UE1 via the connection entity P-CSCFA. In addition, if the terminal UE1 is connected to a plurality of access networks and if registered via those access networks with the server S-CSCF, it also transmits to the server P-CSCFA the contact addresses associated with the terminal UE1 and known to the core network CN (step F30) together with the corresponding IP addresses of the terminal UE1 on the access networks received from the servers P-CSCF during successive registrations via those access networks. Once registered with the core network CN over the access network ANA, the terminal UE1 sets up a communication COM/ANA with the terminal UE2 over this network in order to exchange multimedia data (step F40).

In known manner, in order to set up this communication, the terminal UE1 sends an SIP INVITE request for setting up a call to the terminal UE2 over the access network ANA, and containing the characteristics of the media session SMA desired by the terminal UE1 for this communication. The term "media session" is used herein to mean one or more media streams (i.e. audio stream, video stream, etc.), each media stream being identified by a connection address and by its associated media descriptions (e.g. codec).

This request is routed to the application server TAS in charge of managing communications for the terminal UE1.

In addition, a logic communications channel is put into place to convey the signaling associated with the communication COM/ANA. Since the server P-CSCFA is configured in "back-to-back user agent" mode, this communication channel is split into two subchannels or SIP dialogs. Thus, two SIP dialogs are created on opposite sides of the server P-CSCFA:
  a dialog between the terminal UE1 and the server P-CSCFA; and
  a dialog between the server P-CSCFA and the telephone application server TAS.

Each dialog is identified in unique manner by a dialog identifier ("dialog ID") that comprises, in accordance with document IETF RFC3261: a communication identifier (Call-ID); an origin identifier (From tag); and a designation identifier (To tag) for the communication (or message). Below, the identifiers for the dialog set up over the network ANA between the terminal UE1 and the server P-CSCFA for the communication COM/ANA are written DiagID_AN, and the identifiers of the dialog set up over the core network CN between the server P-CSCFA and the application server TAS for the communication COM/ANA are written DiagID_CN.

The correspondence between the dialog identifiers DiagID_AN and DiagID_CN is stored in a database B1 of the non-volatile memory 5 of the server P-CSCFA. These dialog identifiers serve to identify the communication respectively in the access network ANA and in the core network CN. These are the identifiers of the communication COM/ANA in the meaning of the invention.

It should be observed that when the server P-CSCFA is operating in proxy mode, only one dialog is set up for the communication COM/ANA, such that the dialog identifiers DiagID_AN and DiagID_CN are identical. In other words, the communication is identified by the same identifier in the access network ANA and in the core network CN.

Since the other steps needed for setting up the communication COM/ANA are known to the person skilled in the art, they are described in greater detail herein.

It is now assumed that the terminal UE1 seeks to cause the communication COM/ANA to be handed over to the network ANB. It should be observed that this handover may take place equally well at the initiative of the user of the terminal UE1 (e.g. by pressing on a predefined button on the terminal UE1 or by using a menu presented on a screen of the terminal UE1), of the terminal itself (e.g. as a result of detecting poor quality in the radio link over the network ANA), or indeed of the operator.

For this purpose, prior to requesting changeover, the terminal UE1 registers with the core network CN over the access network ANB, in a manner similar to its above-described registration over the access network ANA.

Thus, an SIP REGISTER request for requesting registration is sent by the terminal UE1 over the network ANB to the core network CN: it contains in particular the IP address @UE1B_AN of the terminal UE1 on the network ANB.

This registration request passes via the connection entity P-CSCFB (step F50), which generates a contact address @UE1B_CN associated with the IP address @UE1B_AN of the terminal UE1 on the access network ANB. This contact address @UE1B_CN corresponds to the IP address @PB_CN of the connection entity P-CSCFB on the core network CN enriched by contextual information relating to the terminal UE1.

The connection entity P-CSCFB transfers the registration request and the contact address @UE1B_CN of the terminal UE1 to the server S-CSCF (step F60). In the presently-described implementation, the connection entity P-CSCFB also transmits the IP address @UE1B_AN of the terminal UE1 on the access network ANB to the server S-CSCF in a specific parameter of the registration request.

In response to this request, the server S-CSCF transmits a validity duration for the registration to the terminal UE1 via the connection entity P-CSCFB (steps F70-F90).

In addition, since the terminal UE1 is connected to a plurality of access networks and is registered via those networks with the server S-CSCF, the server also transmits, in its response, the contact addresses associated with the terminal UE1 that are known to the core network CN, specifically in this example: the addresses @UE1A_CN and @UE1B_CN, together with the corresponding IP addresses of the terminal UE1 on the access networks ANA and ANB, i.e. @UE1A_AN and @UE1B_AN, as received from the servers P-CSCFA and P-CSCFB while registering the terminal UE1 via the access networks ANA and ANB.

On receiving the response from the server S-CSCF, the connection entity P-CSCFB stores the following for the terminal UE1 in a database B2 of its non-volatile memory 5 (step F80):

the contact address @UE1B_CN associated with the IP address @UE1B_AN of the terminal UE1 on the network ANB; and the contact address @UE1A_CN associated with the IP address @UE1A_AN of the terminal UE1 on the network ANA.

Once registered with the core network CN over the access network ANB, and in order to cause the communication COM/ANA to be handed over to the network ANB, the terminal UE1 sends a handover request Req over the network ANB (step F100). Naturally, it is assumed that the terminal UE1 has previously acted in known manner to reserve the resources needed in the network ANB for establishing the communication. In the presently-described implementation, the request Req is an SIP INVITE call setup request containing a predefined Handover header representing the handover request of the terminal.

Naturally, other headers could be included in the SIP INVITE request in order to perform the invention. In known manner, like the presently-proposed Handover header, these headers must constitute the subject matter of a prior declaration with the Internet assigned number authority (IANA) in order to comply with the SIP protocol.

In addition, in the presently-described example, the handover request of the terminal is manifested by the presence of a predefined header in the INVITE request (i.e. the Handover header). In a variant, this handover request of the terminal could be manifested by using a new SIP method introduced for the needs of the invention. In accordance with the invention, the handover request Req comprises:

an identifier for the communication: these are the identifiers DiagID_AN of the dialog set up for the communication COM/ANA over the access network ANA between the terminal UE1 and the server P-CSCFA;

information relating to a media session SMB associated with the communication COM/ANB over the access network ANB: this information comprises in particular the characteristics of the media session MSB (i.e. the media streams such as an audio stream, a video stream, etc.) desired by the terminal UE1 for the call COM after it has been handed over to the network AMB;

where appropriate, information relating to the media session SMA associated with the communication COM/ANA; and information representative of at least one treatment to be applied to the media session SMA; this treatment may in particular comprise partial or total release of the resources engaged for the sessions SMA.

In this example, the information representative of the treatment to be applied to the session SMA is contained in the Handover header of the request. In the presently-described implementation, the Handover header of the request also contains the IP address @UE1A_AN of the terminal UE1 on the network ANA.

As explained above, the information relating to the media session SMA is added, where appropriate, to the information about the treatment that is specified in the Handover header of the request e.g. by describing the specific media streams that are concerned by the treatment. This information is present in the Handover request, in particular when the requested treatment comprises partial release of resources.

In contrast, when the requested treatment is total release of the resources, there is no need to transmit additional information about the session SMA.

Appendix 1 gives an example of a handover request Req that might be sent by the terminal UE1 over the access network ANB in accordance with the invention.

In this example:
- the dialog identifiers DiagID_AN are given the content of the fields "Call-Id", "To tag", and "From tag";
- the information relating to the media session SMB and, where appropriate, to the media session SMA, is contained in the session description protocol (SDP) offer "New_SDP_on-ANB"; and
- the address @UE1A_AN of the terminal UE1 on the network ANA and the treatment to be applied to the media session SMA are specified in the Handover header in the fields "contact" and "trt" respectively. Thus, the treatment required by the terminal UE1 in this example corresponds to totally releasing the media resources engaged for the session SMA.

The request Req is sent by the terminal UE1 over the access network ANB (step F100): it is carried by a radio signal sent via the communications means 11-B of the terminal UE1. This radio signal constitutes a signal in accordance with the invention.

The request Req is received by the connection entity P-CSCFB, the entry point of the terminal UE1 to the core network CN via the access network ANB. In the received request Req, the connection entity detects the presence of the Handover header relating to a handover request (step F110). This header informs the connection entity P-CSCFB that it is to contact the connection entity through which the communication COM/ANA is passing (i.e. the entity P-CSCFA in this example) in order to inform it of the treatment(s) to be applied to the media session SMA.

For this purpose, the connection entity P-CSCFB begins by identifying the connection entity via which the communication COM/ANA is passing.

For this purpose, it extracts the address @UE1A_AN of the terminal UE1 included in the Handover header of the request and it interrogates the database B2 using this address. It thus obtains the contact address @UE1A_CN of the terminal UE1 that is stored in B2 in association with the address @UE1A_AN.

As mentioned above, the contact address @UE1A_CN is constituted by the IP address @PA_CN of the connection entity P-CSCFA on the core network CN enriched with contextual information associated with the terminal UE1 (or more generally with the subscriber of the terminal UE1). The connection entity P-CSCFB can thus easily use means known to the person skilled in the art to extract the IP address @PA_CN of the connection entity P-CSCFA from the contact address @UE1A_CN.

Thereafter, the connection entity P-CSCFB sends to the connection entity P-CSCFA as identified in this way at the address @PA_CN that has been obtained not only the identifier DiagID_AN of the communication received from the terminal, but also the information representative of the treatment(s) to be applied to the media session SMA (step F120), together with the information relating to the media session SMA, where appropriate.

To do this, it transfers to the connection entity P-CSCFA the handover request Req as received from the terminal in a modified form Req'. A dialog is thus established between the entities P-CSCFA and P-CSCFB.

Appendix 2 illustrates an example of a handover request Req' transferred by the server P-CSCFB to the server P-CSCFA after receiving the handover request Req as described in Appendix 1.

Among the modifications made to the request Req, there can be seen in particular the request "To" update (in the line after "INVITE") in the Handover header.

In addition, in the request Req', the "Call-Id" field contains the identifier of the communication, DiagID_AN, now enriched with a "handover" prefix for informing the connection entity P-CSCFA that the communication identified in the "Call-Id" field corresponds to an ongoing dialog other than the dialog set up with the connection entity P-CSCFB.

Furthermore, in the example of Appendix 2, the SDP offer "New_SDP_on_ANB" is transmitted to the connection entity P-CSCFA as received in the handover request, in other words together with the information about the session SMB, and where appropriate the information about the session SMA. Naturally, the connection entity P-CSCFA is suitable for extracting the session information relating to the session SMA from this SDP offer.

In a variant, if the SDP offer contained in the changeover request received from the terminal contains information about the session SMA, it is possible for this to be the only information that is transmitted in the request Req' to the connection entity P-CSCFA, e.g. in a new SDP offer.

In the presently-described implementation, the connection entity P-CSCFA through which the communication to be handed over is passing is identified by the connection entity P-CSCFB using the IP address of the terminal on the access network ANA as contained in the Handover header of the handover request and from a correspondence table matching the contact addresses of the terminal with its IP addresses on the access network as set up dynamically by the entity P-CSCFB during registration of the terminal with the core network (cf. step F80).

In a variant, in another implementation of the invention, the terminal UE1 transmits in the Handover header of the handover request an identifier about the access network ANA of the connect entity P-CSCFA through which the communication for handing over is passing (e.g. with reference to Appendix 2, this identifier is contained in the "dest" field of the Handover header). In addition, in this embodiment, the connection entity has a static table in its memory B2 providing for each connection entity for connection to the core network CN the correspondence between an identifier of the entity on the access network that it connects to the core network and an identifier of the entity on the core network. Consulting this table with the help of the identifier contained in the handover request enables the entity P-CSCFB to identify the entity P-CSCFA on the core network in order to transmit the request Req' thereto.

On receiving the request Req', the connection entity P-CSCFA analyzes the content of the Handover header and performs the treatment(s) for application to the session SMA as described in the header, e.g. in this example total release of the media resources engaged for the session SMA on the network ANA (step F130).

It should be observed that treatments other than those specified explicitly in the request Req' might also be performed by the connection entity P-CSCFA, in particular stopping latent procedures relating to the session SMA (e.g. procedures for releasing the session on detecting media inactivity). These treatments stem implicitly from the total or partial release of the resources as requested in the request Req'.

Where appropriate, and as described above, the request Req' may also contain additional information about the media streams concerned by the treatment(s) to be applied to the session SMA (in particular when a partial handover of the session is requested).

The connection entity P-CSCFA informs the connection entity P-CSCFB that the treatments requested by the terminal have been applied to the session SMA, e.g. in the Handover header of a message in response to the request Req' (step F140). In a variant, the treatment(s) specified in the Handover header may be applied to the session SMA by the connection entity P-CSCFA after receiving from the connection entity P-CSCFB a message confirming that the communication has been handed over onto the network ANB.

Appendix 3 shows an example of a message in response to the request Req' shown in Appendix 2, as sent by the server P-CSCFA to the server P-CSCFB after applying the requested treatment(s). In its Handover header, this response message indicates that the resources have been released by the server P-CSCFA ("trt=release_done").

In the presently-described implementation, the response message also includes in its Handover header contextual information relating to the communication COM/ANA set up in the network ANA by the terminal UE1.

In general manner, contextual information is used to mean any type of information relating to the setting up of the call on the network ANA and stored in the server P-CSCFA in association with an identifier of the call (e.g. in this example with the identifier DiagID_AN).

In the presently-envisaged example, the contextual information inserted by the server P-CSCFA and obtained with the help of the identifier DiagID_AN as received in the request Req' advantageously includes the dialog identifiers DiagID_CN of the communication in the core network CN and the set of entities that are to be passed through in the core network CN (routeset).

In the presently-described implementation, since the servers P-CSCF of the core network CN are configured in "back-to-back user agent" mode, the communication identifier DiagID_AN supplied by the terminal in the request Req is different from the identifier DiagID_CN used in the core network CN. Nevertheless, the correspondence between these identifiers is contained in the connection entity P-CSCFA and is stored in the database B1 as described above. Sending the identifier DiagID_CN to the connection entity P-CSCFB makes it possible to establish continuity for the call COM while it is being transferred to the network ANB, as described below.

In another implementation in which the servers P-CSCF of the core network CN are configured in proxy mode, the communication identifier DiagID_AN supplied by the terminal in the request Req is identical to the identifier DiagID_CN used in the core network CN. The server P-CSCFB can then obtain the identifier of the communication used in the core network directly from the request Req without consulting the server P-CSCFA.

In the example shown in Appendix 3, the contextual information transmitted by P-CSCFA to P-CSCFB is contained in the fields "Call-Id", "localtag", "remotetag", "target", and "routeset" in the Handover header.

In a variant, it is possible to insert other contextual information into the response message of the connection entity P-CSCFA in addition to the dialog identifiers DiagID_CN and the "routeset", such as for example other information defined in the "dialog state" described in the document IETF RFC3261, or information relating to the registration context of the user on the server P-CSCF1, to the current subscription contexts, etc.

On receiving the response message sent by the entity P-CSCFA, the connection entity P-CSCFB updates the handover request received from the terminal UE1 (step F150).

More precisely, it eliminates the Handover header from the request and inserts the received context information in the response message. This context information relating to the dialog on the core network side is inserted, where appropriate, as a replacement for the corresponding information on the access network side: thus, the dialog identifiers DiagID_CN take the place of the dialog identifiers DiagID_AN contained in the request Req. The session information remains unchanged.

The new request as modified in this way, written Req", is transmitted to the application server TAS (step F160).

It should be observed that, with the exception of the contact field, the request Req" is identical with a "re-invitation" request as could be sent by the server P-CSCFA to the application server TAS, since it contains the context information relating to the communication COM/ANA stored on the server P-CSCFA. This ensures continuity for the communication COM while it is being changed over to the network ANB.

Appendix 4 shows an example of a modified request Req" obtained after the server P-CSCFB has updated the request Req shown in Appendix 1. As mentioned above, this request no longer has the Handover header. In addition, it contains the dialog identifiers associated with the ongoing communication over the IP core network (the contents of the fields "To tag", "From tag", and "Call-Id"), the routeset ("E1;E2;E3"), and the session information transmitted by the terminal UE1 in the request Req (SDP offer "New_SDP_on-ANB").

The re-invitation request Req" is received by the server S-CSCF, which routes it in this example to the application server TAS. The treatment of this request (and in particular the creation of the media session SMB) then continues as a conventional renegotiation of the parameters of an ongoing communication in the core network CN (steps F170-F190). Since this treatment is itself known, it is not described in greater detail herein. The changeover of the communication COM to the network ANB is completed at the end of this treatment (step F200).

It should be observed that the changeover of the signaling associated with the communication COM to the network ANB is effective as soon as the request Req has been sent by the terminal UE1. The invention advantageously makes it possible to hand over the signaling associated with the communication COM in full to the network ANB: it does not require any signaling to be exchanged over the network ANA between the terminal UE1 and the entities of the core network in order to hand over the communication COM and in particular in order to release the resources used for the session SMA.

In the presently-described implementation, consideration is given to setting up a "logical" dialog channel between the two entities P-CSCFA and P-CSCFB in order to perform the invention. This logical channel is ephemeral, in the sense that it is created on a call-by-call basis, whenever an explicit handover request is sent by the terminal.

In a variant, the invention may rely on a physical channel, set up permanently by the construction of the network between the two connection entities, or more generally between various connection entities of the network performing the invention. The handover request sent by the terminals would then make use of pre-existing channels for conveying information about the handover via appropriate signaling. In the SIP protocol, the invention could in particular make use of the SUBSCRIBE methods for creating permanent channels between the connection entities, and the NOTIFY or INFO methods for conveying the handover requests and the information relating on the handover on the channels.

In addition, in the presently-described implementation, the connection entities performing the treatment method of the invention are servers P-CSCF of the IP core network. In a variant, the invention is equally applicable to other connection entities controlling (directly or indirectly via explicit requests) the media plane and the signaling plane of the network. Thus, the invention also applies when the architecture of the IP core network is based on security elements such as SBC servers. In such an implementation, the treatment method of the invention is performed by the SBC servers.

APPENDIX 1

INVITE DiagID_AN remote_target_TAS SIP/2.0
   To: <sip:UEdé@same_or_other_operator.ims.com>tag=DiagID_AN_rem
   From: <sip:UE_SC@operator.ims.com>tag=DiagID_AN_loc
     Call-Id: DiagID_AN
     CSeq: 43 INVITE
     Contact: @UE1B_AN
   Handover: contact=@UE1A_AN;dest=@PA_AN;trt=release
[ ... ]
   New_SDP_on_ANB

APPENDIX 2

INVITE @PA_CN SIP/2.0
   To: <sip:UEdé@same_or_other_operator.ims.com>tag=DiagID_AN_rem
   From: <sip:UE_SC@operator.ims.com>tag=DiagID_AN_loc
     Call-Id: handover_DiagID_AN
     CSeq: 43 INVITE
     Contact: @PB_CN
   Handover: contact=@UE1A_AN;trt=release
[ ... ]
   New_SDP_on_ANB

APPENDIX 3

SIP/2.0 333 Handover done
   To: <sip:UEdé@same_or_other_operator.ims.com>tag=DiagID_AN_rem
   From: <sip:UE_SC@operator.ims.com>tag=DiagID_AN_loc
     Call-Id: handover_DiagID_AN
     CSeq: 43 INVITE
     Contact: @PA_CN
   Handover:trt=release_done;CallId=DiagID_CN;localtag=DiagID_CN_loc;remotetag=DiagID_CN_rem;target=DiagID_CN_remote_target;routeset=E 1;E2;E3
[ ... ]
   New_SDP_on_ANB

APPENDIX 4

INVITE DiagID_CN_remote_target SIP/2.0
   To: <sip:UEdé@same_or_other_operator.ims.com>tag=DiagID_CN_rem
   From: <sip:UE_SC@operator.ims.com>tag=DiagID_CN_loc
     Call-Id: DiagID_CN
     CSeq: 43 INVITE
     Contact: @PB_CN
     Route: E1;E2;E3
[ ... ]
   New_SDP_on_ANB

The invention claimed is:

1. A method of processing a request performed by a first connection entity for connecting a first access network to a core network, the method comprising:
receiving a handover request to hand over to the first access network a call set up by a terminal on a second access network, the request being received from the terminal over the first access network and comprising:
an identifier of the communication;
information about a media session associated with the communication over the first access network; and
information representative of at least one treatment to be applied to a media session associated with the communication on the second access network;
identifying from the handover request a second connection entity for connecting the second access network to the core network through which the communication set up over the second access network is passing;
transmitting the communication identifier and the information representative of said at least one treatment to the second entity as identified in this way in order to apply said at least one treatment; and
transferring the handover request to the core network together with the information about the media session and an identifier of the communication in the core network as obtained with the help of the communication identifier received from the terminal.

2. A method according to claim 1 for treating a request, wherein the handover request received from the terminal further includes information relating to the media session associated with the communication on the second access network, said information being transmitted to the second entity, at least in part and together with the identifier of the communication and the information representative of said at least one treatment.

3. A method according to claim 1 for treating a request in which the identifier of the communication in the core network is obtained from the second entity.

4. A method according to claim 3 for treating a request further comprising:
obtaining context information relating to the communication from the second entity and with the help of the identifier of the communication received from the terminal, the context information containing the identifier of the communication in the core network; and
inserting said context information into the handover request before transferring it to the core network.

5. A method according to claim 4 for treating a request, wherein the identifier of the communication and the information representative of said at least one treatment are transmitted via a physical channel that has previously been set up between the first entity and the second entity, the context information being obtained via this channel.

6. A method according to claim 1 of treating a request, wherein during said identifying process, the second connection entity is identified with the help of an identifier of the terminal in the second access network and contained in the handover request.

7. A method according to claim 6 for treating a request, wherein the predefined header of the handover request also contains the identifier of the terminal in the second access network.

8. A method according to claim 1 for treating a request, wherein:
the core network is an IP network implementing the SIP protocol;

the handover request received from the terminal is an INVITE call setup request; and the information representative of said at least one treatment is contained in a predefined header of the handover request received from the terminal.

9. A method according to claim 8 for treating a request, wherein the predefined header of the handover request also contains the identifier of the terminal in the second access network.

10. A method of treating a media session, the method comprising:

receiving a request coming from a first connection entity for connecting a first access network to a core network, said first connection entity being in charge of handing over to the first access network a communication that has been set up by a terminal over a second access network, said request comprising:
an identifier of the communication; and
information representative of at least one treatment to be applied to a media session relating to said communication; and applying said at least one treatment to the media session;

said treatment method being performed by a second connection entity for connecting the second access network to the core network, and through which said communication is passing.

11. A method of sending a request from a terminal on a first access network connected to a core network via a first connection entity, said request being a handover request to hand over to the first access network a communication set up by the terminal over a second access network wherein said handover request comprises:
an identifier of the communication;
information relating to a media session associated with the communication on the first access network; and
information representative of at least one treatment to be applied to a media session associated with the communication on the second access network.

12. A connection entity for connecting a first access network to a core network, the connection entity comprising:
a component configured to receive a handover request for handing over to the first access network a communication set up by a terminal over a second access network, said request being received from the terminal over the first access network and comprising:
an identifier of the communication;
information relating to a media session associated with the communication on the first access network; and
information representative of at least one treatment to be applied to a media session associated with the communication on the second access network;
a component configured to identify from the handover request a second connection entity for connecting the second access network to the core network and via which the communication set up over the second access network is passing;
the identifier of the communication and the information representative of said at least one treatment to the second entity as identified in this way in order to apply said at least one treatment; and
a component configured to transfer to the core network the handover request together with the information relating to the media session and an identifier of the communication in the core network as obtained with the help of the identifier of the communication received from the terminal.

13. A connection entity according to claim 12, wherein said connection entity comprises components a component configured to obtain said identifier of the communication in the core network from the second entity.

14. A connection entity comprising:
a component configured to receive a request coming from a first connection entity for connecting a first access network to a core network, said first entity being in charge of handing over to the first access network a communication set up by a terminal on a second access network, said request comprising:
an identifier of the communication; and
information representative of at least one treatment to be applied to a media session relating to the communication; and
a component configured to apply said at least one treatment to the media session;
said entity being a connection entity for connecting the second access network to the core network and via which said communication is passing.

15. A multimode terminal suitable for communicating over first and second access networks connected to a core network, said terminal comprising:
a component configured to set up a communication over the second access network; and
a component configured to send over the first access network a handover request for handing said communication over to the first access network, said request comprising:
an identifier of the call;
information relating to a media session associated with the communication on the first access network; and
information representative of at least one treatment to be applied to a media session associated with the communication on the second access network.

16. A communications system comprising:
(a) a multimode terminal adapted to communicate over first and second access networks, and for sending a handover request to the first access network for handing over a communication set up on the second access network said multimode terminal comprising:
a component configured to set up a communication over the second access network; and
a component configured to send over the first access network a handover request for handing said communication over to the first access network, said request comprising:
an identifier of the call;
information relating to a media session associated with the communication on the first access network; and
information representative of at least one treatment to be applied to a media session associated with the communication on the second access network;
(b) a first connection entity for connecting the first access network to a core network and adapted to process said handover request said first connection entity comprising:
a component configured to receive a handover request for handing over to the first access network a communication set up by a terminal over a second access network, said request being received from the terminal over the first access network and comprising:
an identifier of the communication;
information relating to a media session associated with the communication on the first access network; and information representative of at least one treatment to be applied to a media session associated with the communication on the second access network;
a component configured to identify from the handover request a second connection entity for connecting the second access network to the core network and via which the communication set up over the second access network is passing;
the identifier of the communication and the information representative of said at least one treatment to the second entity as identified in this way in order to apply said at least one treatment; and
a component configured to transfer to the core network the handover request together with the information relating to the media session and an identifier of the communication in the core network as obtained with the help of the identifier of the communication received from the terminal; and
(c) a second connection entity for connecting the second access network to the core network and through which said communication over the second access network passes, the second connection entity being adapted to apply at least one treatment to a media session associated with said communication, said second connection entity comprising:
a component configured to receive a request coming from a first connection entity for connecting a first access network to a core network, said first entity being in charge of handing over to the first access network a communication set up by a terminal on a second access network, said request comprising:
an identifier of the communication; and
information representative of at least one treatment to be applied to a media session relating to the communication; and
a component configured to apply said at least one treatment to the media session;
said entity being a connection entity for connecting the second access network to the core network and via which said communication is passing.

17. A computer program product stored on a non-transitory computer-readable medium and executable by a microprocessor of a connection entity for connecting an access network to a core network, wherein the product comprises program code instructions for executing a method of processing a request, wherein the method comprises:
receiving a handover request to hand over to a first access network a call set up by a terminal on a second access network, the request being received from the terminal over the first access network and comprising:
an identifier of the communication;
information about a media session associated with the communication over the first access network; and
information representative of at least one treatment to be applied to a media session associated with the communication on the second access network;
identifying from the handover request a second connection entity for connecting the second access network to the core network through which the communication set up over the second access network is passing;
transmitting the communication identifier and the information representative of said at least one treatment to the second entity as identified in this way in order to apply said at least one treatment; and
transferring the handover request to the core network together with the information about the media session and an identifier of the communication in the core network as obtained with the help of the communication identifier received from the terminal.

18. A computer program product stored on a non-transitory computer-readable medium and executable by a microprocessor of a connection entity for connecting an access network to a core network, wherein the product comprises program code instructions for executing a method of treating a media session, wherein the method comprises:
receiving a request coming from a first connection entity for connecting a first access network to a core network, said first connection entity being in charge of handing over to the first access network a communication that has been set up by a terminal over a second access network, said request comprising:
an identifier of the communication; and
information representative of at least one treatment to be applied to a media session relating to said communication; and
applying said at least one treatment to the media session;
said treatment method being performed by a second connection entity for connecting the second access network to the core network, and through which said communication is passing.

19. A computer program product stored on a non-transitory computer-readable medium and executable by a microprocessor of a terminal, wherein the product comprises program code instructions for executing a method of sending a request from a terminal on a first access network connected to a core network via a first connection entity, said request being a handover request to hand over to the first access network a communication set up by the terminal over a second access network, wherein the handover request comprises:
an identifier of the communication;
information relating to a media session associated with the communication on the first access network; and
information representative of at least one treatment to be applied to a media session associated with the communication on the second access network.

20. A communications system comprising:
(a) a multimode terminal adapted to communicate over first and second access networks, and for sending a handover request to the first access network for handing over a communication set up on the second access network, said multimode terminal comprising:
a component configured to set up a communication over the second access network; and
a component configured to send over the first access network a handover request for handing said communication over to the first access network, said request comprising:
an identifier of the call;
information relating to a media session associated with the communication on the first access network; and
information representative of at least one treatment to be applied to a media session associated with the communication on the second access network;
(b) a first connection entity for connecting the first access network to a core network and adapted to process said handover request, said first connection entity comprising:
a component configured to receive a handover request for handing over to the first access network a communication set up by a terminal over a second access network, said request being received from the terminal over the first access network and comprising:
an identifier of the communication;

information relating to a media session associated with the communication on the first access network; and information representative of at least one treatment to be applied to a media session associated with the communication on the second access network;

a component configured to identify from the handover request a second connection entity for connecting the second access network to the core network and via which the communication set up over the second access network is passing;

the identifier of the communication and the information representative of said at least one treatment to the second entity as identified in this way in order to apply said at least one treatment; and a component configured to transfer to the core network the handover request together with the information relating to the media session and an identifier of the communication in the core network as obtained with the help of the identifier of the communication received from the terminal, wherein said connection entity comprises a component configured to obtain said identifier of the communication in the core network from the second entity; and (c) a second connection entity for connecting the second access network to the core network and through which said communication over the second access network passes, the second connection entity being adapted to apply at least one treatment to a media session associated with said communication, said second connection entity comprising:

a component configured to receive a request coming from a first connection entity for connecting a first access network to a core network, said first entity being in charge of handing over to the first access network a communication set up by a terminal on a second access network, said request comprising:

an identifier of the communication; and information representative of at least one treatment to be applied to a media session relating to the communication; and a component configured to apply said at least one treatment to the media session;

said entity being a connection entity for connecting the second access network to the core network and via which said communication is passing.

* * * * *